United States Patent [19]

Greenhalf

[11] Patent Number: 4,557,136

[45] Date of Patent: Dec. 10, 1985

[54] VALVE TESTING

[75] Inventor: Edward J. Greenhalf, Wellington, England

[73] Assignee: Greenwood Moore Limited, Shropshire, England

[21] Appl. No.: 638,775

[22] Filed: Aug. 8, 1984

[30] Foreign Application Priority Data

Aug. 12, 1983 [GB] United Kingdom ... 8321751

[51] Int. Cl.⁴ .................................... G01L 27/00
[52] U.S. Cl. ................................................ 73/4 R
[58] Field of Search ........................................ 73/4 R

[56] References Cited

U.S. PATENT DOCUMENTS 3,269,170 9/1964 Sebring et al. .

FOREIGN PATENT DOCUMENTS 0007769 7/1979 European Pat. Off. .
0017365 3/1980 European Pat. Off. .
2062812 5/1981 United Kingdom .

*Primary Examiner*—S. Clement Swisher
*Attorney, Agent, or Firm*—Leydig, Voit & Mayer

[57] ABSTRACT

A method of testing a relief or safety valve of the type which includes a valve member, urged into engagement with a seat by a spring arrangement and an adjustment member by means of which the urging force exerted on the valve member by the spring arrangement can be adjusted, the method including the steps of applying a force to an end of the spring arrangement where the latter is operatively connected to the adjustment member, in a manner to continue to urge the valve member into engagement with the seat, and measuring the force thus applied at the moment when said force is just sufficient to disengage the operative connection between the spring arrangement and the adjustment member. The invention also relates to a method of setting a relief or safety valve and to a valve suitable for use in the method of testing and setting.

10 Claims, 5 Drawing Figures

VALVE TESTING

This invention relates to relief or safety valves and to a method of testing and setting same.

Safety valves typically comprise a valve member which is urged into engagement with a seat by biassing means (which may be a helical compresion spring or one or more torsion bars), and a screw-threaded adjustment member by means of which the urging force exerted on the valve member by the biassing means can be adjusted. It is highly inconvenient to remove such safety valves from an installation for bench-testing, and therefore techniques have been developed whereby the valve can be tested in situ and preferably also on load.

Published U.K. Patent Application No. 2062812 discloses such a technique, wherein an external force is exerted on a spindle which is fixed to the valve member, the force being applied in a direction to overcome the loading of the biassing means. When the valve member disengages from the seat, a measurement of the external force is made, and from this measurement it is possible to calculate a theoretical pressure at which the valve will operate. If the calculated pressure deviates significantly from the desired operating pressure of the valve, suitable adjustments are made by means of the adjustment member.

This technique does however have several notable disadvantages. In order to calculate the theoretical operating pressure of the valve, it is necessary to have knowledge of the area of the seat. This area is very difficult to measure when the valve is in situ, and of course cannot be measured at all when the valve is on load, because the valve must be partially dismantled in order to gain access to the seat. Moreover, particularly in high pressure applications, a small percentage error in measuring the area of the seat can result in a large absolute error in the calculated operating pressure.

As mentioned previously, the external force is applied to the spindle in a direction to oppose the loading of the biassing means. Because the external force thus acts in the same direction as the pressure loading, there is a danger of premature "blowing" of the valve with the consequent risk of damage to the finely lapped engagement surfaces of the valve member and the seat. In addition, because the external force acts in a direction to open the valve, the loading of the spring on the adjustment member is not relaxed and so it can be very difficult to perform accurate adjustment of the latter: indeed, any effort made to turn the adjustment member may be transmitted frictionally to the valve member, causing undesirable turning of the latter on the seat.

Furthermore, the testing technique disclosed in published U.K. Patent Application No. 2062812 cannot be used to determine the spring rate of the biassing means when the safety valve is on load, since this would involve lifting the valve member off the seat for a significant time, thereby losing fluid pressure and again risking damage to the engagement surfaces of these parts.

It is an object of the present invention to overcome the above-described disadvantages.

According to a first aspect of the present invention, there is provided a method of testing a relief or safety valve of the type which comprises a valve member urged into engagement with a seat by biassing means, and an adjustment member by means of which the urging force exerted on the valve member by the biassing means can be adjusted, the method including the steps of applying a force to an end of the biassing means where the latter is operatively connected to the adjustment member, in a manner to continue to urge the valve member into engagement with the seat, and measuring the force thus applied at the moment when said force is just sufficient to disengage the operative connection between the biassing means and the adjustment member.

This method is suitable for use where the valve seat area is known and it is also known that the valve is in good working order.

The above testing method can be performed on a bench, for example before the valve is installed in its operational location. It is, however, preferred to perform the testing when the valve is on load, in which case the following steps can be effected after the operative connection between the biassing means and the adjustment member has been disengaged as aforesaid: the adjustment member is adjusted away from the biassing means; the force applied to the biassing means is relaxed until leakage just occurs between the valve member and the seat; and measurements are made on the force thus applied to the biassing means at this point and on the distance moved by the said end of the biassing means during said relaxation of the force. This method is particularly suitable for use where the valve seat area is not known accurately and/or the valve condition is suspect.

According to a second aspect of the present invention there is provided a method of setting a relief or safety valve of the type wherein a valve member is urged into engagement with a valve seat by biasing means and an adjustment member provides a means of adjusting the force exerted on the valve member by the biasing means, the method including the steps of testing as specified above, applying to said one end of said biasing means the desired loading calculated by way of the results obtained by the testing, and tightening said adjustment member to take up said loading applied to the end of said biasing means.

According to a further aspect of the present invention, there is provided a relief or safety valve suitable for the performance of the above-described method, the valve comprising a casing having a fluid inlet and a fluid outlet, a valve seat and a valve member disposed in the casing so as to control the flow of fluid from the inlet to the outlet, biassing means which urges the valve member into engagement with the valve seat but whose urging force can be overcome by the pressure of fluid at the inlet, whereby the valve member becomes disengaged from the valve seat, and an adjustment member in screw-threaded engagement with the casing and operatively engaged with an end of the biassing means, whereby the force with which the latter urges the valve member against the valve seat can be adjusted, and an operating member having one end thereof engaged with said end of the biassing means and the other end thereof extending to the exterior of the casing, whereby the operative connection between the adjustment member and the biassing means can be disengaged by applying an external force to the operating member.

In the case where the valve member is provided with a spindle which acts to guide movement of the valve member when it disengages from the valve seat as aforesaid, the operating member is preferably in the form of a sleeve which is disposed around the spindle.

The invention will now be described, by way of example only, with reference to the accompanying drawings, in which.

Figure 1:
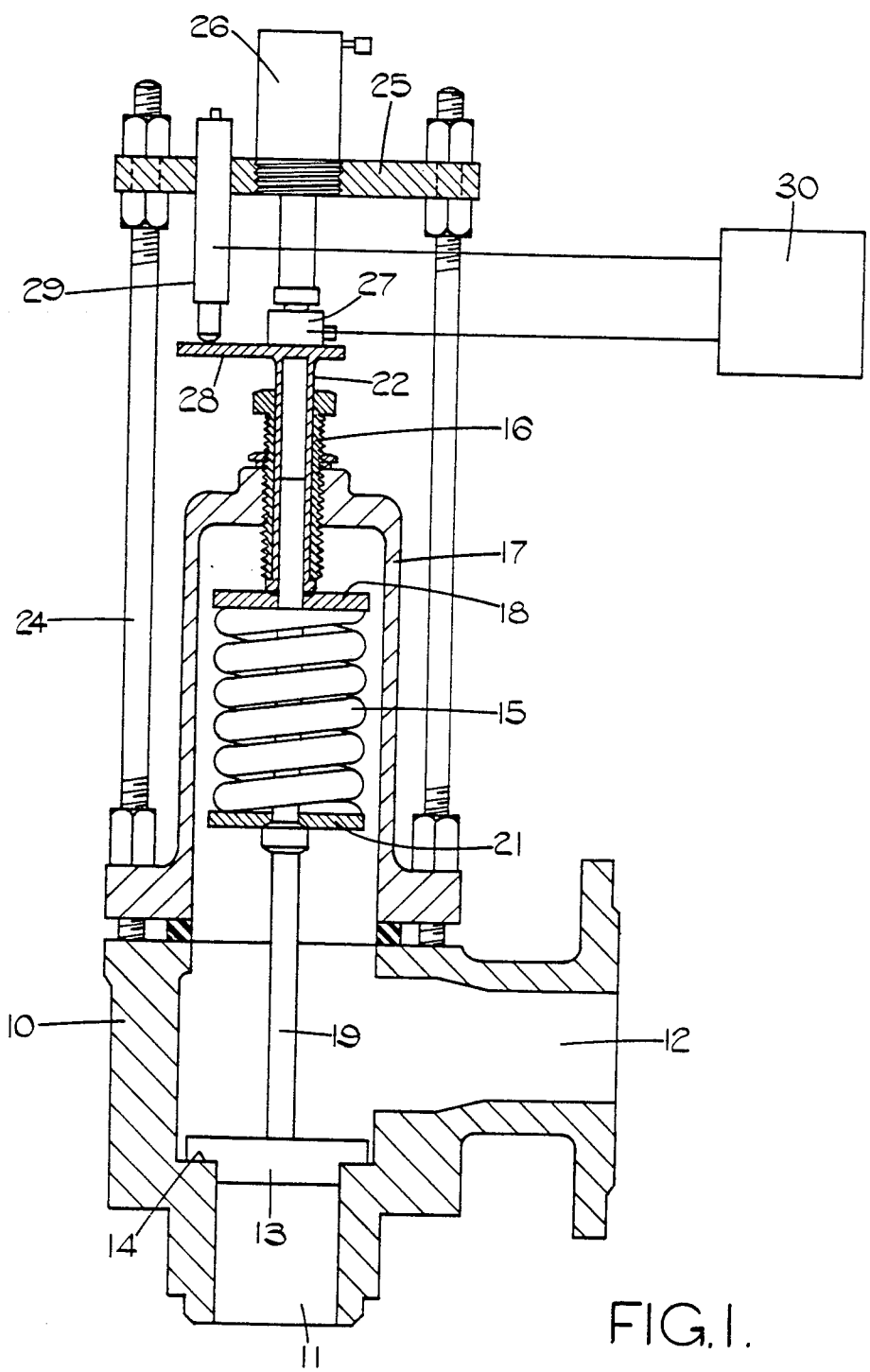
FIG. 1 is a schematic diagram illustrating apparatus for testing valves by a method according to the present invention.
Figure 2:
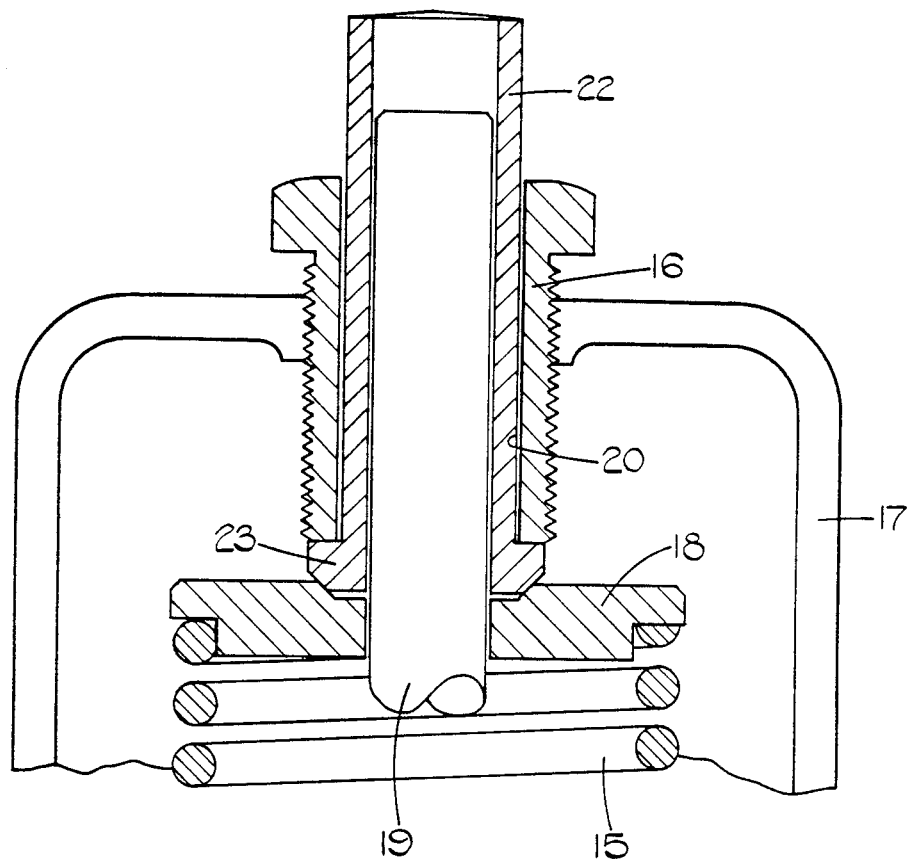
FIG. 2 is an enlarged sectional view of part of the valve being tested.

In FIGS. 1 and 2, there is shown a relief or safety valve which comprises a casing 10 having a fluid inlet 11 and a fluid outlet 12. A valve member in the form of a dome or disc 13 co-operates with a valve seat 14 to control the flow of fluid from the inlet 11 to the outlet 12. A helical compression spring 15 normally biasses the disc 13 into engagement with the seat 14, but its biassing force can be overcome to lift the disc 13 off the seat 14 when the fluid pressure at the inlet 11 exceeds a preset value, determined by the load exerted by the spring 15 on the disc 13. This loading can be adjusted by turning an adjustment screw 16 which is in screw-threaded engagement with a bonnet 17 of the casing 10 and which acts upon an abutment plate or "button" 18 engaged with the upper end of the spring 15. A spindle 19 is fixed to the disc 13 and passes slidably through a central opening 20 in the adjustment screw 16. A second abutment plate 21 is carried by the spindle 19 and engages the lower end of the spring 15.

Thus far described, the safety valve is entirely conventional. However, to enable the valve to be tested by the method of the invention, a modification is made to the conventional valve construction: namely, the radial space between the spindle 19 and the side wall of the opening 20 in the adjustment screw 16 is enlarged to permit a sleeve 22 to be slidably received therein. Such enlargement of the radial space can be achieved by enlarging the diameter of the opening 20 and/or by reducing the external diameter of the spindle 19 in this region. An upper end of the sleeve 22 extends upwardly from the exterior of the casing bonnet 17, while the lower end of the sleeve is provided with a flange 23 which locates between the adjustment screw 16 and the abutment plate 18.

Testing of the valve is performed using apparatus as depicted in FIG. 1, comprising a frame 24 which is bolted or otherwise fixedly secured to the valve. A bridge 25 at the upper end of the frame 24 carries an hydraulic piston and cylinder unit 26 which acts upon the upper end of the sleeve 22 through the intermediary of an interposed load cell 27. An arm 28 is also interposed between the unit 26 and the sleeve 22, and acts as a position indicator for a linear transducer 29 also mounted on the bridge 25. Signals from the load cell 27 and the transducer 29 are supplied to a digital recorder 30 having a print-out facility.

The sequence of operations for testing the valve on-load (i.e. with a fluid pressure present at the inlet 11) is as follows. Firstly, the piston and cylinder unit 26 is operated so as to press the sleeve 22 downwardly, thereby applying a compressive force to the upper end of the spring 15. The force thus applied by the unit 26 is progressively increased until the transducer 29 records a minute movement of the arm 28, whereupon the force measured by the load cell 27 is recorded. This reading represents the preset loading of the valve, and if the valve is known to be in good working condition, that is to say it is known to have a spring of the correct rate which has not weakened, it is known to have a seat in good condition and there is known to be no sticking of the disc 13, and if the area of the valve seat is known, then it may be unnecessary to perform further measurements and the valve can be set on the basis of the measurement taken when the arm 28 starts to move.

In such circumstances, which are in practice very unlikely to occur, the load applied by the unit 26 is increased slightly to ensure that the adjustment screw 16 is free from the loading of the spring 15 and the unit 26 is operated to apply the predetermined required loading to he spring 15 whereupon the screw 16 is adjusted to take up this loading applied by the unit 26 to the spring 15. Thereafter the unit 26 is removed leaving the valve with said predetermined required loading applied by the spring 15 to the disc 13 and seat 14.

It is more usual however for either or both of the valve seat area and the valve condition to be unknown with the necessary degree of accuracy. In such circumstances it is not essential to know the preset loading of the valve at the commencement of testing but it is useful to know it since by comparing it with the intended loading it gives an indication of the condition of the valve or at least of the spring. Thus the steps indicated above are performed with or without noting the loading actually applied by the spring.

The adjustment screw 16 is then turned to move the latter away from the upper end of the spring 15. Such turning of the screw 16 is greatly facilitated by the fact that the loading of the spring is taken by the sleeve 22 rather than by the adjustment screw itself. The load imposed by the hydraulic unit 26 is then noted and gradually reduced until slight leakage of the fluid occurs between the disc 13 and the seat 14: this will happen at a so-called "leakage pressure" which, as is well established in this technical field, is some 90 to 95% of the pressure corresponding to the actual preset loading of the valve. At this point, the reading from the load cell 27 is recorded, as is the distance which has been moved by the arm 28 (and hence the upper end of the spring 15) as measured by the transducer 29 starting from a point at which the load reduction was commenced.

These measurements are used to determine the condition of the valve components and if necessary the valve seat area, so that from these measurements it is, with experience, possible to calculate the loading which the spring must apply to the disc 13 and seat 14 to achieve the required load rating of the valve. Assuming that no valve fault exists, the unit 26 is adjusted so that it applies the calculated desired preset loading to the spring 15, and the adjustment screw 16 is tightened down into engagement with the upper end of the spring once again, to take up the loading imposed by the unit 26.

If it is possible to do so it is helpful to repeat the measurements, prior to setting the valve with the valve subject to different operating pressure. This procedure, which is not essential, is not usually possible when the valve is in a working installation but may be possible when bench testing. Thus before setting the valve by adjusting the screw 16 to take up the correct loading imposed by the unit 26, the loading imposed by the unit 26 is increased to re-seat the disc 13 firmly on the seat 14, whereupon the fluid pressure at the valve inlet 11 is increased, preferably by about 5%. The above sequence of operations is then repeated, and the readings from the load cell 27 and the transducer 29 are recorded once again when leakage just starts to occur. As mentioned above, from these measurements it is then possible to calculate the actual preset loading of the valve, and also to determine if there is any fault in the spring 15 or the seat 14.

If desired, an assessment of the spring 15 can now be made over the range of its operational movement, by progressively compressing the spring by means of the unit 26 and recording the loading and movement at different positions, as measured by the load cell 27 and the transducer 29, respectively. In this way, an accurate assessment of the spring rate can be obtained while the valve is on-load. It will be recognised that the previous measurements will however give a good indication of the spring rate.

From the above-description, it will be manifest that the disc 13 is maintained in tight engagement with the seat 14 during the testing sequence, except for the short time when slight leakage is allowed to occur. Accordingly, a full assessment of the general condition and the probable performance of the valve can be made without any significant loss of fluid pressure there being no danger of the valve "blowing" with a consequential risk of the engagement surfaces of the seat and the disc being damaged.

Although the testing procedure has been described above as being performed when the valve is on load, it will be appreciated that the method of the invention is also applicable to bench testing. Thus, it is possible to test the valve after the latter has been assembled but prior to installation in a pressurized system, or during pre-test commissioning of the system after the valve has been installed, or while the valve is in the system and subject to working pressure.

Figure 3:
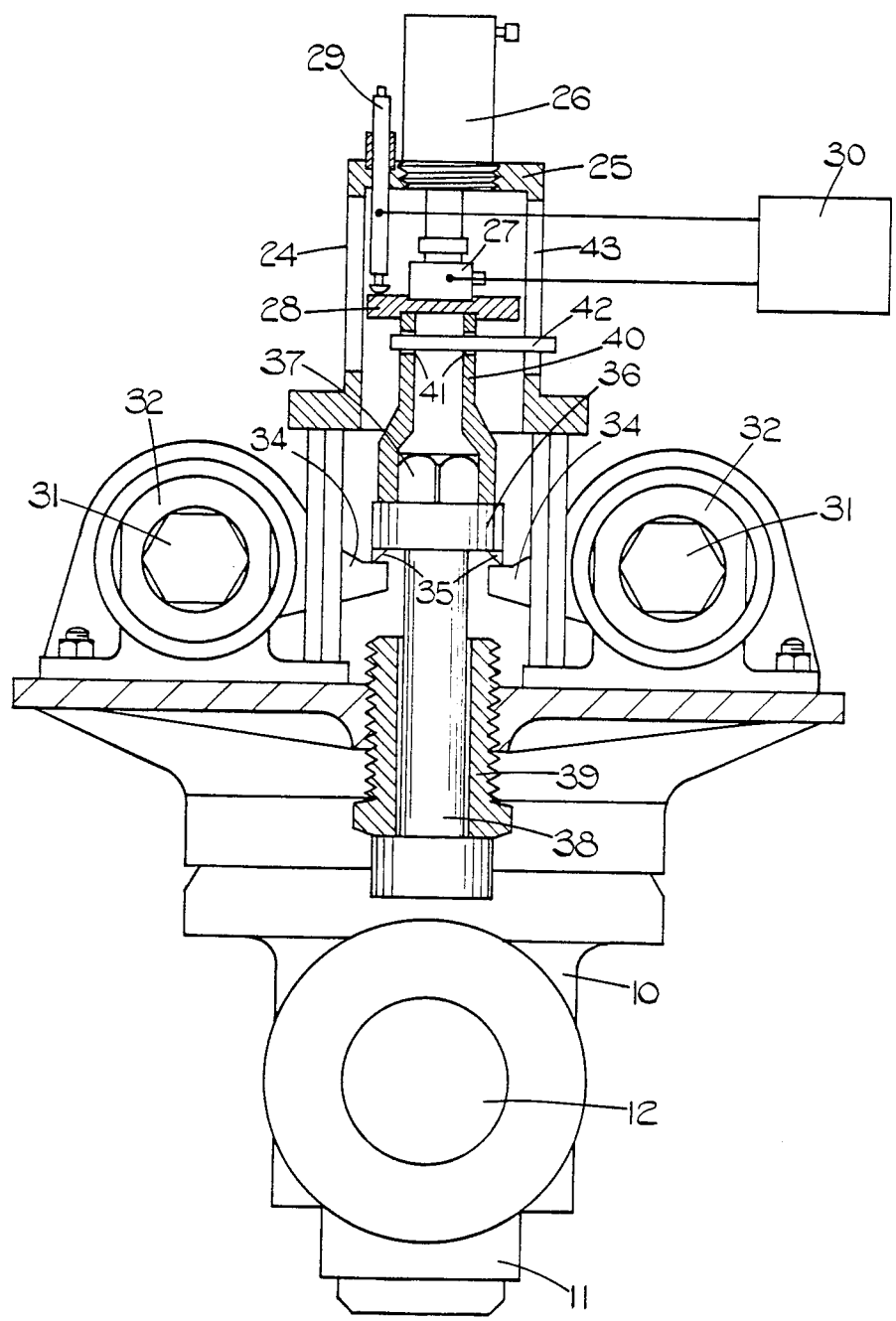
FIG. 3 is a similar diagram to FIG. 1 but showing a different type of valve being tested.

FIG. 3 illustrates a different form of relief of safety valve which can be tested by the method of the invention. The valve once again comprises a casing having an inlet and an outlet, a valve member mounted on a spindle, and a valve seat. In this case, however, the valve member is biassed into engagement with the valve seat by a torsion bar arrangement. More particularly, a pair of torsion bars 31 are mounted in bearing blocks 32 on the valve casing 10 and are twisted about their longitudinal axes. At one end thereof, the torsion bars 31 have lever arms 34 which bear upwardly against respective knife-edges 35 on a collar 36. At their other ends, the torsion bars have similar lever arms (not shown) by means of which torque is transmitted to the valve spindle. The collar 36 is secured by means of a nut 37 to the upper end of an adjusting spindle 38 which passes through a central opening in an adjustment screw 39, the latter being in threaded engagement with the valve casing 10. The biassing force applied by the torsion bars 31 to the valve member/seat can thus be adjusted by turning the screw 39, thereby to alter the torsion in the bars 31.

The apparatus for performing the testing method of the invention comprises, as before, a frame 24 which is secured to the valve casing 10, an hydraulic piston and cylinder unit 26, a load cell 27, an arm 28, a linear transducer 29 and a recorder 30. A hexagon socket 40 is received over the nut 37 on the adjusting spindle 38 of the valve, and the hydraulic unit 26 acts on the socket 40 by way of the load cell 27 and the arm 28. Testing is performed in an exactly analogous manner to that described previously, except that the unit 26 acts on the torsion bars 31 as opposed to the helical spring 15.

Figure 4:
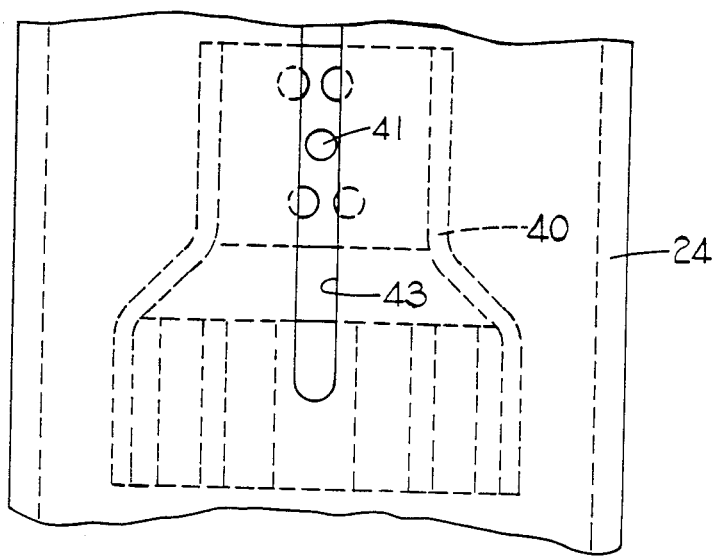
FIGS. 4 and 5 are views of part of the testing apparatus used in FIG. 3.
Figure 5:
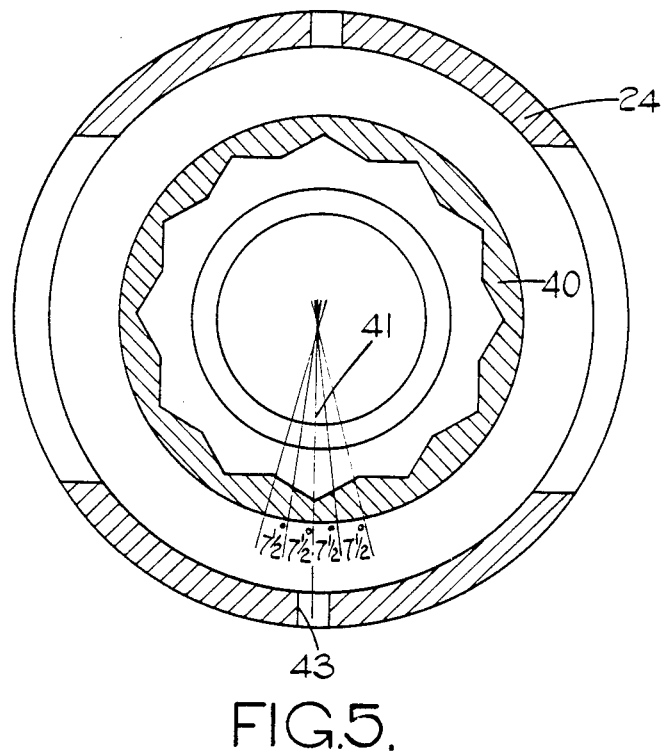

When the unit 26 imposes a load on the collar 36 by way of the socket 40, there is a possibility that adjustment of the spindle 38 may, under certain conditions, cause the knife-edges 35 to slip on the lever arms 34. If the knife-edges should become disengaged from the lever arms, then the full tension held in the torsion bars 31 will be released with possible disasterous consequences. To prevent such shifting of the knife-edges 35, the socket 40 is provided with holes 41 through which a guide pin 42 is inserted, and the frame 24 is slotted at 43 to receive the guide pin (see also FIGS. 4 and 5). The guide pin 42 thus keys the socket 40, and hence the nut 37 and the collar 36, against rotation relative to the apparatus while permitting the socket 40 to move upwardly and downwardly by sliding along the slot 43. As can be seen to advantage particularly in FIG. 4, a number of holes 41 are provided in the socket 40 at predetermined small angular intervals (e.g. $7\frac{1}{2}°$) so that one of these holes will always be substantially in alignment with the slot 43 regardless of the angular orientation of the nut 37.

I claim:

1. A method of testing a relief or safety valve of the type which includes a valve member, urged into engagement with a seat by biassing means, and an adjustment member by means of which the urging force exerted on the valve member by the biassing means can be adjusted, the method including the steps of applying a force to an end of the biassing means where the latter is operatively connected to the adjustment member, in a manner to continue to urge the valve member into engagement with the seat, and measuring the force thus applied at the moment when said force is just sufficient to disengage the operative connection between the biassing means and the adjustment member.

2. A method as claimed in claim 1, further including the steps of adjusting the adjustment member away from the biasing means after said disengagement of said operative connection, relaxing the force applied to said biasing means until leakage just occurs between the valve member and the seat and measuring the force applied to the biasing means at the point in said relaxation at which said leakage commences and the distance through which said end of the biasing means has moved to reach said point.

3. A method of testing a relief or safety valve of the type which includes a valve member, urged into engagement with a seat by biassing means, and an adjustment member by means of which the urging force exerted on the valve member by the biassing means can be adjusted, the method including the steps of applying a force to an end of the biassing means where the latter is operatively connected to the adjustment member in a manner to continue to urge the valve member into engagement with the seat, and sufficient to disengage the operative connection between the biassing means and the adjustment member, adjusting the adjustment member away from the biasing means after said disengagement of said operative connection, measuring the force applied to said end of the biasing means, relaxing the force applied to said biasing means until leakage just occurs between the valve member and the seat and measuring the force applied to the biasing means at the point in said relaxation at which said leakage commences and the distance through which said end of the biasing means has moved to reach said point.

4. A method of setting a relief or safety valve of the type wherein a valve member is urged into engagement with a valve seat by biasing means and an adjustment member provides a means of adjusting the force exerted on the valve member by the biasing means, the method including
 (a) the steps of testing the valve as claimed in any one of claims 1 to 3,
 (b) applying to said one end of said biasing means the desired loading calculated by way of the results obtained by the testing, and,
 (c) tightening said adjustment member to take up said loading applied to the end of said biasing means.

5. A method as claimed in any one of claims 1 to 3 wherein said biasing means is a helically wound compression spring.

6. A method as claimed in any one of claims 1 to 3, wherein said biasing means is a torsion bar arrangement.

7. A method as claimed in claim 4 wherein said biasing means is a helically wound compression spring.

8. A method as claimed in claim 4 wherein said biasing means is a torsion bar arrangement.

9. A relief or safety valve comprising a casing having a fluid inlet and a fluid outlet, a valve seat and a valve member disposed in the casing so as to control the flow of fluid from the inlet to the outlet, biassing means which urges the valve member into engagement with the valve seat but whose urging force can be overcome by the pressure of fluid at the inlet, whereby the valve member becomes disengaged from the valve seat, and an adjustment member in screw-threaded engagement with the casing and operatively engaged with an end of the biassing means, whereby the force with which the latter urges the valve member against the valve seat can be adjusted, the improvement including the provision of an operating member having one end thereof engaged with said end of the biassing means and the other end thereof extending to the exterior of the casing, whereby the operative connection between the adjustment member and the biassing means can be disengaged by applying an external force to the operating member.

10. A valve as claimed in claim 9 wherein the valve member is provided with a spindle which acts to guide movement of the valve member when it disengages from the valve seat as aforesaid, and the operating member is in the form of a sleeve which is disposed around the spindle.

* * * * *